(12) United States Patent
Guerrero et al.

(10) Patent No.: US 10,290,429 B2
(45) Date of Patent: May 14, 2019

(54) WIRE TO ANODE CONNECTION

(71) Applicant: KEMET Electronics Corporation, Simpsonville, SC (US)

(72) Inventors: Christian L. Guerrero, Simpsonville, SC (US); Jeffrey Poltorak, Simpsonville, SC (US); Yuri Freeman, Simpsonville, SC (US); Steve C. Hussey, Simpsonville, SC (US); Chris Stolarski, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 0 days.

(21) Appl. No.: 15/872,075

(22) Filed: Jan. 16, 2018

(65) Prior Publication Data
US 2018/0204680 A1    Jul. 19, 2018

Related U.S. Application Data

(60) Provisional application No. 62/447,123, filed on Jan. 17, 2017.

(51) Int. Cl.
| | | |
|---|---|---|
| *H01G 9/15* | (2006.01) | |
| *H01G 9/20* | (2006.01) | |
| *H01G 9/012* | (2006.01) | |
| *H01G 9/00* | (2006.01) | |
| *H01G 9/052* | (2006.01) | |
| *H01G 9/042* | (2006.01) | |
| *H01G 9/008* | (2006.01) | |
| *H01G 9/04* | (2006.01) | |

(52) U.S. Cl.
CPC .......... *H01G 9/0525* (2013.01); *H01G 9/008* (2013.01); *H01G 9/0029* (2013.01); *H01G 9/012* (2013.01); *H01G 9/042* (2013.01); *H01G 9/052* (2013.01); *H01G 2009/0404* (2013.01)

(58) Field of Classification Search
CPC ........ H01G 9/15; H01G 9/012; H01G 9/0029; H01G 9/052; H01G 2009/0014
USPC ................................ 29/25.03; 361/523, 528
See application file for complete search history.

(56) References Cited

U.S. PATENT DOCUMENTS

| | | |
|---|---|---|
| 4,520,430 A | 5/1985 | Long et al. |
| 4,574,333 A | 3/1986 | Snyder |

(Continued)

FOREIGN PATENT DOCUMENTS

| | | |
|---|---|---|
| DE | 4408579 A1 | 9/1995 |
| DE | 4408579 C2 | 11/2001 |

(Continued)

*Primary Examiner* — Eric W Thomas
*Assistant Examiner* — Arun Ramaswamy
(74) *Attorney, Agent, or Firm* — Joseph T. Guy; Patent Filing Specialist, Inc.

(57) ABSTRACT

An improved capacitor is provided wherein the capacitor has an improved bond between the anode and anode wire. The anode comprises a pressed anode powder comprising a first density region and a second density region wherein the second density region has a higher density than the first density region. An anode wire extends into the second density region wherein the anode wire in the second density region is distorted by compression. This allows for better utilization of the metal powder surface area by allowing a lower bulk press density and lower sinter temperature while still achieving the necessary wire pull strength. In addition, this invention when utilized with deoxidation steps, results in sufficient wire pull strengths not possible otherwise.

35 Claims, 9 Drawing Sheets

(56) References Cited

U.S. PATENT DOCUMENTS

| | | |
|---|---|---|
| 4,791,532 A | 12/1988 | Gouvernelle et al. |
| 4,945,452 A | 7/1990 | Sturmer et al. |
| 5,357,399 A | 10/1994 | Salisbury |
| 5,394,295 A | 2/1995 | Galvagni et al. |
| 5,483,415 A | 1/1996 | Nakamura et al. |
| 5,643,432 A | 7/1997 | Qiu |
| 5,667,536 A | 9/1997 | Hasegawa |
| 5,734,546 A | 3/1998 | Kuriyama et al. |
| 6,212,065 B1 | 4/2001 | Pozdeev-Freeman et al. |
| 6,719,813 B2 | 4/2004 | Kojima et al. |
| 6,775,127 B2 | 8/2004 | Yoshida |
| 7,116,548 B2 | 10/2006 | Satterfield, Jr. et al. |
| 7,342,775 B2 | 3/2008 | Hahn et al. |
| 7,361,202 B2 | 4/2008 | Naito et al. |
| 7,410,609 B2 | 8/2008 | Schnitter |
| 7,731,893 B2 | 6/2010 | Freeman et al. |
| 8,199,461 B2 | 6/2012 | Zenicek et al. |
| 8,279,583 B2 | 10/2012 | Zednicek et al. |
| 8,349,030 B1 | 1/2013 | Hussey et al. |
| 8,441,777 B2 | 5/2013 | Zednicek et al. |
| 2003/0218859 A1 | 11/2003 | Yoshida |
| 2004/0240154 A1 | 12/2004 | Yoshida |
| 2005/0018384 A1 | 1/2005 | Schmitter |
| 2005/0270725 A1 | 12/2005 | Hahn et al. |
| 2006/0070492 A1 | 4/2006 | Qiu |
| 2008/0265220 A1 | 10/2008 | Schnitter |
| 2009/0279233 A1 | 11/2009 | Freeman et al. |
| 2010/0302710 A1 | 12/2010 | Zednicek et al. |
| 2010/0302713 A1 | 12/2010 | Zednicek et al. |
| 2011/0128676 A1 | 6/2011 | Karabulut et al. |

FOREIGN PATENT DOCUMENTS

| | | |
|---|---|---|
| EP | 1045410 A2 | 10/2000 |
| GB | 2374464 B | 10/2002 |
| KR | 101016658 B1 | 10/2009 |
| KR | 101016657 B1 | 2/2011 |
| WO | WO 2001000356 A1 | 1/2001 |
| WO | WO 2002013215 A1 | 2/2002 |
| WO | WO 2006027767 A1 | 3/2006 |

WIRE TO ANODE CONNECTION

CROSS-REFERENCE TO RELATED APPLICATIONS

The present application claims priority to pending U.S. Provisional Application No. 62/447,123 filed Jan. 17, 2017 which is incorporated herein by reference.

BACKGROUND

The present invention is related to a solid electrolytic capacitor comprising a pressed powder anode and an anode wire extending therefrom. More specifically, the present invention is related to a process for improving the connection between the anode wire and anode thereby allowing for the use of powders with a higher charge density per gram (CV/g).

There is an ever increasing demand for electronics with higher capability, lower cost, and better durability. This demand, at the electronics level, places a burden on the component manufacturers to provide more functionality and, often, this increased functionality is required in the same, or less, volume of the electronics. With regards to capacitors this has led to the constant desire to provide higher volumetric efficiency or capacitance per volume of capacitor.

Solid electrolytic capacitors comprising a pressed powder anode with a wire extending therefrom, for connectivity, are well known in the art. The anode wire is in electrical contact with the anode. The anode wire is typically attached to the anode in one of two ways. In one method common to the art the wire is inserted into the anode powder and secured in the powder during the pressing operation. In a second method the anode wire is welded to the anode after pressing. In each case the anode is sintered and, in the case of a welded wire, prior to anode wire attachment.

The ever constant desire for increased volumetric efficiency has lead to the development of anode powders with increasing CV/g. Unfortunately, these new powders have proven to be very difficult to utilize since the particles necessary to achieve the high CV/g fail to form an adequate bond to the anode wire during the pressing and sintering steps. As the CV/g increases, and the anode size decreases, the problem of inadequate bonding to the anode wire is exasperated. This is a particular problem when deoxygenation sintering is utilized as described in commonly assigned U.S. Pat. No. 8,349,030 to Hussey et al. which is incorporated herein by reference. The deoxygenation further erodes the bond between the anode and anode wire often leading to complete dissociation of the two.

One option is to sinter the anode to a higher degree thereby improving the bond strength between the anode wire and anode. The increased sintering temperatures are believed to form more adequate necks between the particles of the powder to gain sufficient wire to anode mechanical strength. Unfortunately, increased sintering reduces the surface area of the anode metal in the anode and thus the CV/g, and ultimately decreasing the capacitance of the resulting capacitor, which eliminates the advantages offered by the more expensive higher charge powder.

Welding the wire to the formed anode is one approach to addressing this problem. In the welding process a broad welding nugget forms inside and outside of the anode edge. One problem with the welded wire is the requirement for double sintering. The first sintering is before the welding to provide mechanical strength to the anode and the second sintering is after the welding to clean the welding nugget. In addition, the use of welded wires on high charge powders and double sintering is problematic due to the oversaturation of the powder particles with oxygen and precipitation of the crystalline oxide.

There is currently no suitable way to utilize the high charge powders to their fullest extent due to the ineffective adhesion between the anode powder and anode wire. Provided herein is an improved method of forming the connection between the anode and anode wire resulting in an improved capacitor.

SUMMARY OF THE INVENTION

It is an object of the invention to provide an improved capacitor comprising an improved connection between the anode and anode wire.

A particular feature of the invention is the ability to utilize high charge capacity anode powders without degradation of the charge capacity due to excess sintering otherwise required to secure the anode wire thereto.

A particular advantage of the instant invention is the ability to utilize high CV/g powders and to process the high CV/g powders in a deoxygenation sintering process which is typically not suitable due to failure of the bond between the anode wire and pressed powder of the anode.

These and other embodiments, as will be realized, are provided in a method for forming an anode wherein the method comprises:
inserting an anode wire in an anode powder with a first portion of the anode wire extending from the anode powder;
pressing a portion of the anode powder to form a bulk region having a first density; and
pressing a second portion of the anode powder with the anode wire in the second portion to form a high density region with a second density wherein the pressing of the second portion is sufficient to distort the anode wire in the second portion.

Yet another embodiment is provided in a capacitor comprising an anode. The anode comprises a pressed anode powder comprising a bulk density region with a first density and a high density region with a second density wherein the second density is higher than the first density region. An anode wire extends into the high density region wherein the anode wire is distorted in the high density region.

DESCRIPTION

Figure 1:
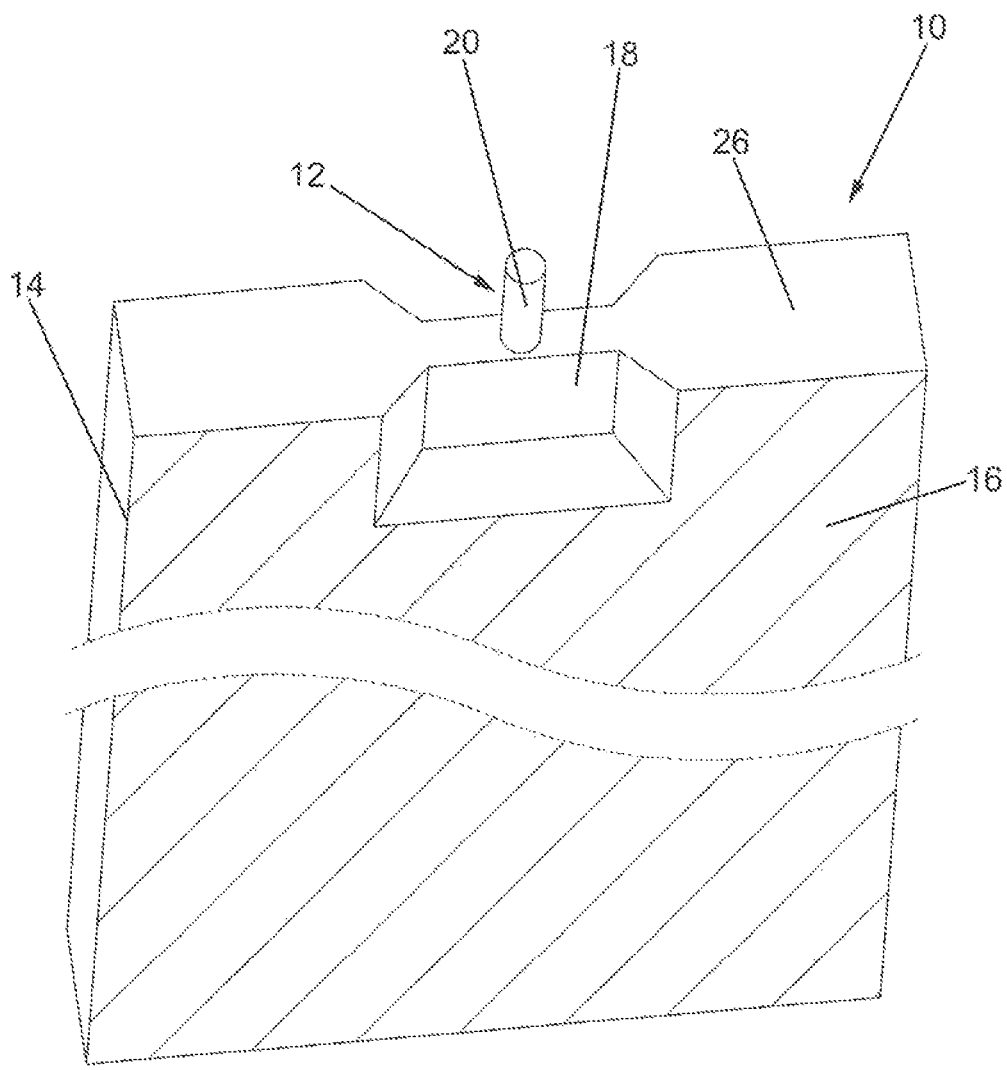
FIG. 1 is a top perspective schematic view of an embodiment of the invention.

The present invention is related to an improved method for connecting an anode wire to an anode and an improved capacitor formed thereby.

The connection between the anode wire, which is preferably tantalum, and the pressed powder forming the anode connection is a particular concern with high charge powders and small anodes. High charge powders have higher volumetric shrinkage and lose surface area faster than lower charge powders at comparable sinter temperatures. Thus, to utilize the high surface area of the high charge powder, lower sinter temperatures are needed. Lower sinter temperatures result in a limited number of contact points and prevent robust connection. By increasing the density of powder in the immediate vicinity of the wire the connection strength is significantly improved.

The present invention solves the aforementioned problem by compressing the powder in the vicinity of the anode wire to the extent necessary to physically distort a portion of the Ta wire during the powder pressing process. Increasing the pressure of the press to the extent necessary to distort the anode wire forms a strong bond between the anode wire and pressed powder thereby allowing for the use of high CV/g powders and/or smaller anode sizes. The increased mechanical strength also allows for sintering at the optimum temperature, with preservation of the high internal surface area, without degradation of the bond between the anode wire and pressed powder anode.

Yet another advantage of the invention is the ability to decrease the length of the anode wire extending into the anode body thereby increasing the amount of anode powder within the same volume of anode. Reducing the amount of wire inside the anode also reduces the cost of the wire. Increasing the amount of powder in the porous anode body is especially an advantage in small size anodes.

The anode powder is pressed, with the anode wire contained therein, by dual density pressing with a low pressure portion, for forming the bulk density of the anode powder, and a high pressure portion in an area containing the wire. The high pressure portion is sufficiently high to cause physical deformation of the, preferably tantalum, wire embedded in the powder as will be more readily understood from further discussions. While not limited thereto a compression ratio of at least 2:1 is sufficient to demonstrate the invention with the advantage exemplified in a significant increase in pull strength. At a compression ratio of 2:1 the high density region is compressed to half the thickness of the bulk density region.

For the purposes of the instant invention a distorted wire is defined as a wire wherein the longest cross-sectional length in the distorted region is at least 10% longer than the equivalent diameter of the wire. More preferably the longest cross-sectional length in the distorted region is at least 15% longer than the equivalent diameter of the wire and even more preferably the longest cross-sectional length in the distorted region is at least 20% longer than the equivalent diameter of the wire Equivalent diameter is the diameter of a circle having the same surface area as a cross-section of the wire taken perpendicular to the long axis.

The low pressure pressing is selected based on the desired bulk density of the anode as well known to those of skill in the art. It is preferable that the high density region have a density which is above that of the bulk density where the high density region has a density which is at least 125% to 200% of the bulk density with the bulk density being the average density of those portions of the anode excluding the high density region and transition. A density in the high density region of at least 150% of the bulk density is preferable. It would be understood to those of skill in the art that the maximum density is the theoretical maximum density of the metal, or about 16.7 g/cc for tantalum. In practice it is not practical to exceed about 90% of the theoretical metal density.

The invention will be described with reference to the figures forming an integral, non-limiting, component of the invention. Throughout the various figures similar elements will be numbered accordingly.

Figure 2:
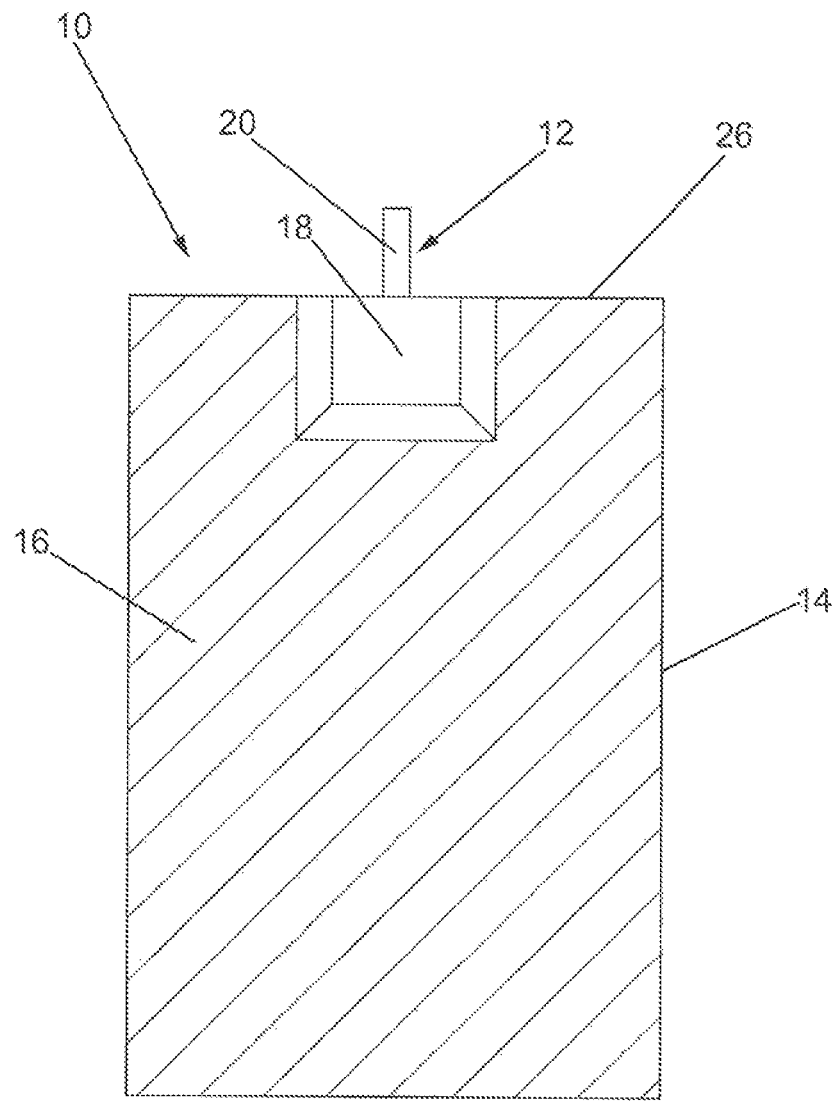
FIG. 2 is a side schematic view of an embodiment of the invention.
Figure 3:
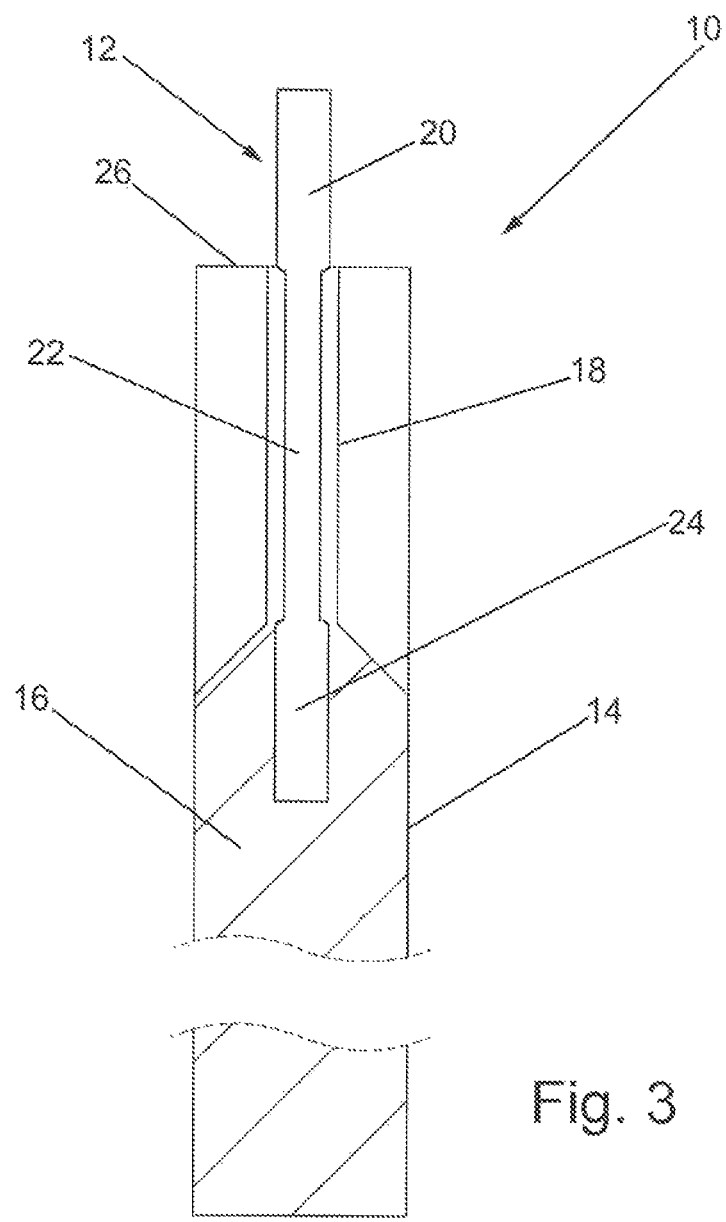
FIG. 3 is a schematic cross-sectional view of an embodiment of the invention.
Figure 4:
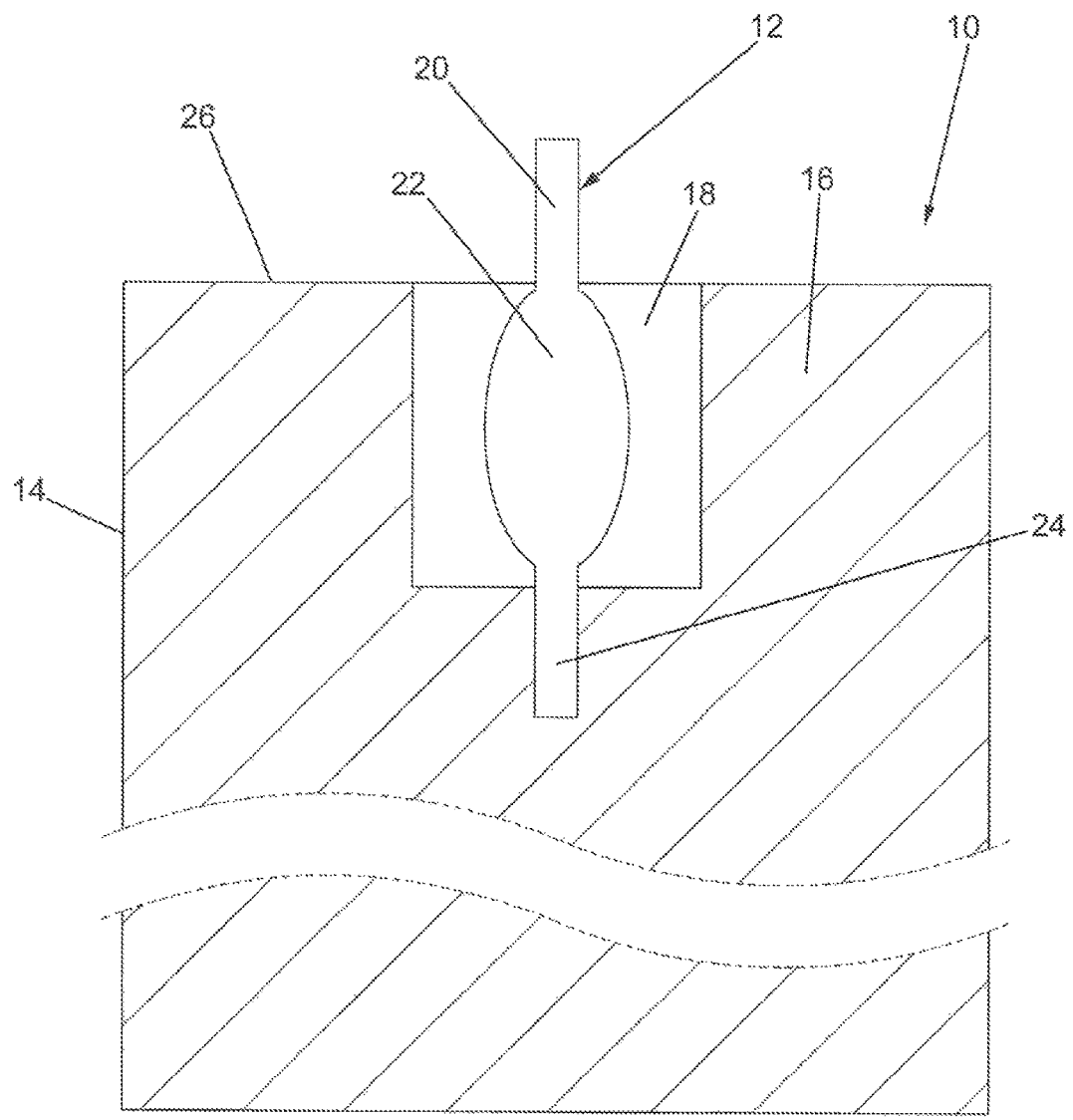
FIG. 4 is a schematic cross-sectional view of an embodiment of the invention.

An embodiment of the invention is illustrated schematically and will be described with reference to FIGS. 1-5. FIG. 1 is a top perspective schematic view, FIG. 2 is a side schematic view, FIG. 3 is a cross-sectional view perpendicular to the compression force applied in the high density region and FIG. 4 is a cross-sectional view parallel to the compression force applied in the high density region. In FIGS. 1-4 a pressed powder anode, 10, is represented as a rectangular body for the purposes of illustration and discussion without limit thereto. An anode wire, 12, extends from the anode body, 14. The bulk region, 16, of the anode body has a bulk density suitable to function as an anode with preferred densities being from about 5 g/cc to about 9 g/cc. A depression in the rectangular body represents the high density region, 18, with the anode wire embedded in the high density region wherein the anode wire in that region is a distorted wire which is deformed, or flattened, by the high pressure applied to achieve the high density region.

Figure 5:
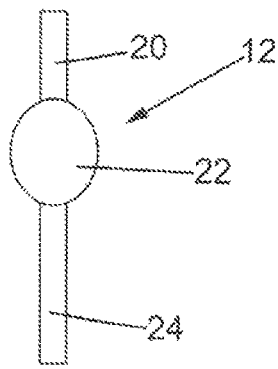
FIG. 5 is a schematic view of an embodiment of the invention.

A distorted anode wire is illustrated schematically in isolation view in FIG. 5. The anode wire comprises a connection portion, 20, above the deformed zone, 22, wherein the connection portion extends out of and away from the anode body and ultimately forms the anode termination of the capacitor. The deformed zone, illustrated as flattened, is deformed relative to the connection portion, or interior portion if present, during the powder pressing operation. The internal portion, 24, which is optional, extends into the interior of the anode body. It is preferable to minimize, or eliminate, the internal portion as this occupies volume otherwise filled with anode material. The deformed portion can be close to the edge of the face of egress from which the first portion of the anode wire extends which is referred to as an edge high density region or it may be located towards the center the anode as will be discussed further herein.

Figure 6:
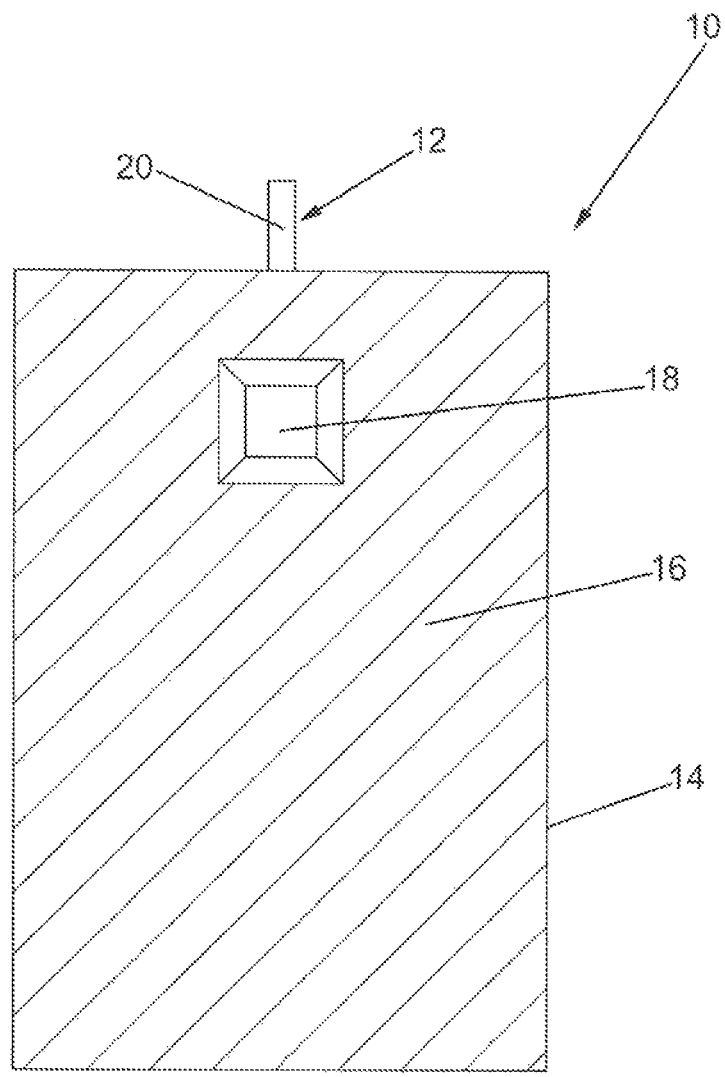
FIG. 6 is a front schematic view of an embodiment of the invention.
Figure 7:
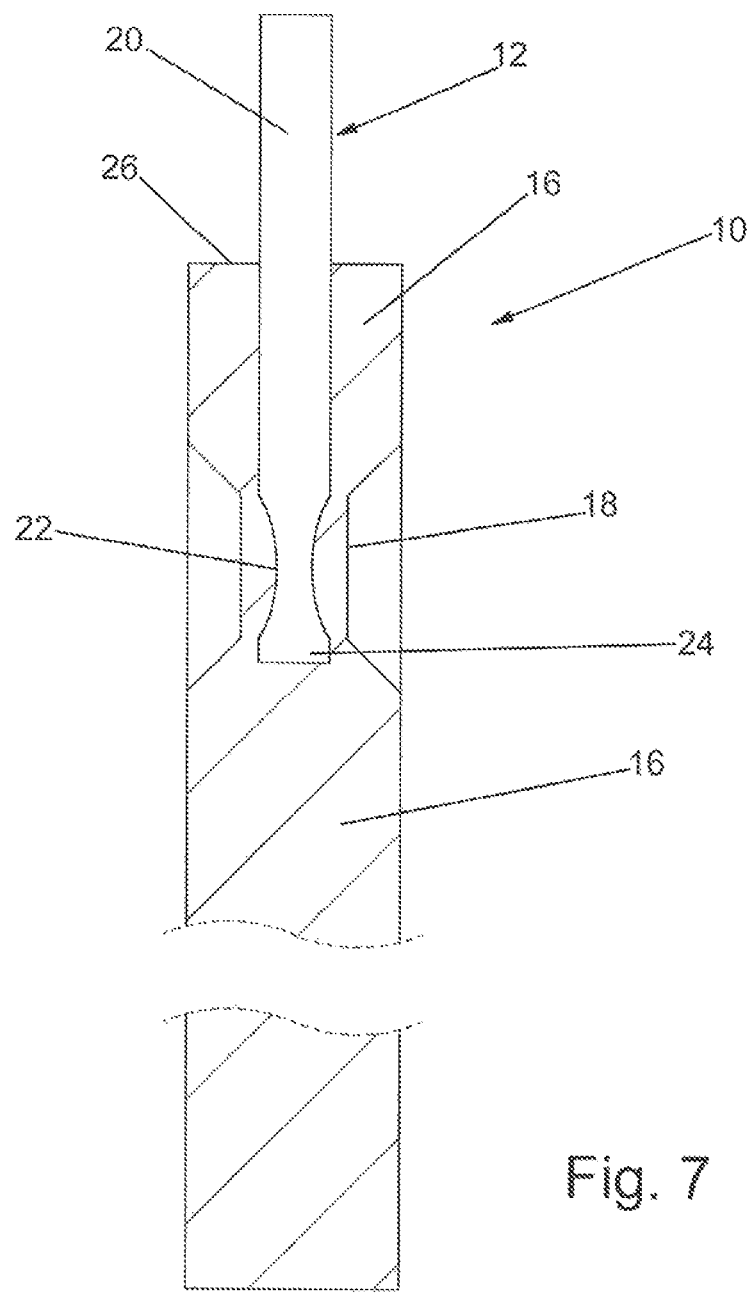
FIG. 7 is a cross-sectional schematic view of an embodiment of the invention.
Figure 8:
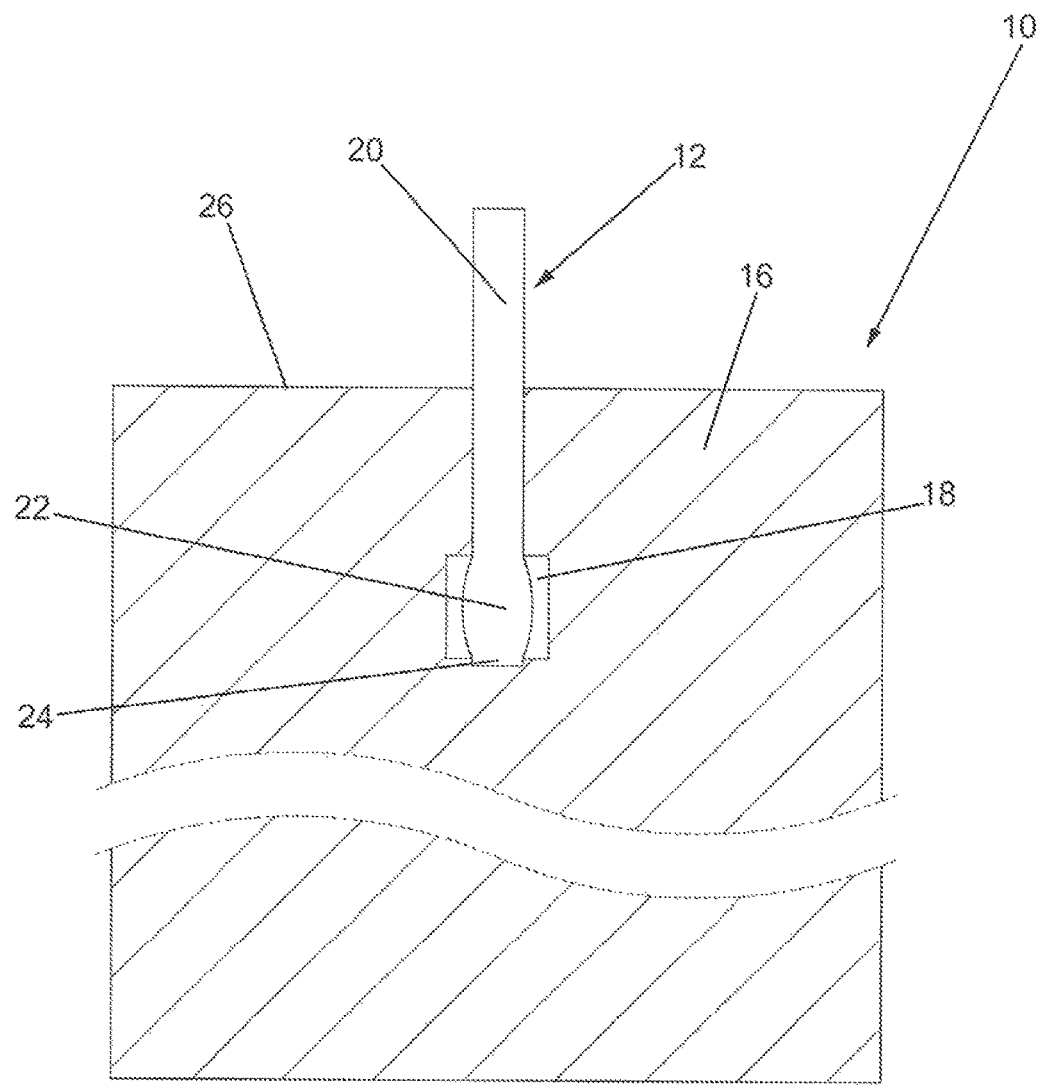
FIG. 8 is a cross-sectional schematic view of an embodiment of the invention.

An embodiment of the invention is illustrated in and will be described with reference to FIGS. 6-8. FIG. 6 is a front schematic view, FIG. 7 is a cross-sectional view perpendicular to the compression force applied in the high density region and FIG. 8 is a cross-sectional view parallel to the compression force applied in the high density region. In FIGS. 6-8 the high density region, 18, is separated from the face of egress, 26, by additional bulk density region, 16. In FIGS. 6-8 the interior portion, 24, of the anode wire, 12, does not extend appreciably into the bulk density region thereby maximizing the powder that can be used in the volume of the anode body. For the purposes of this invention a high density region which is separated from the face of egress of the anode wire is referred to as an inset high density region.

Figure 9:
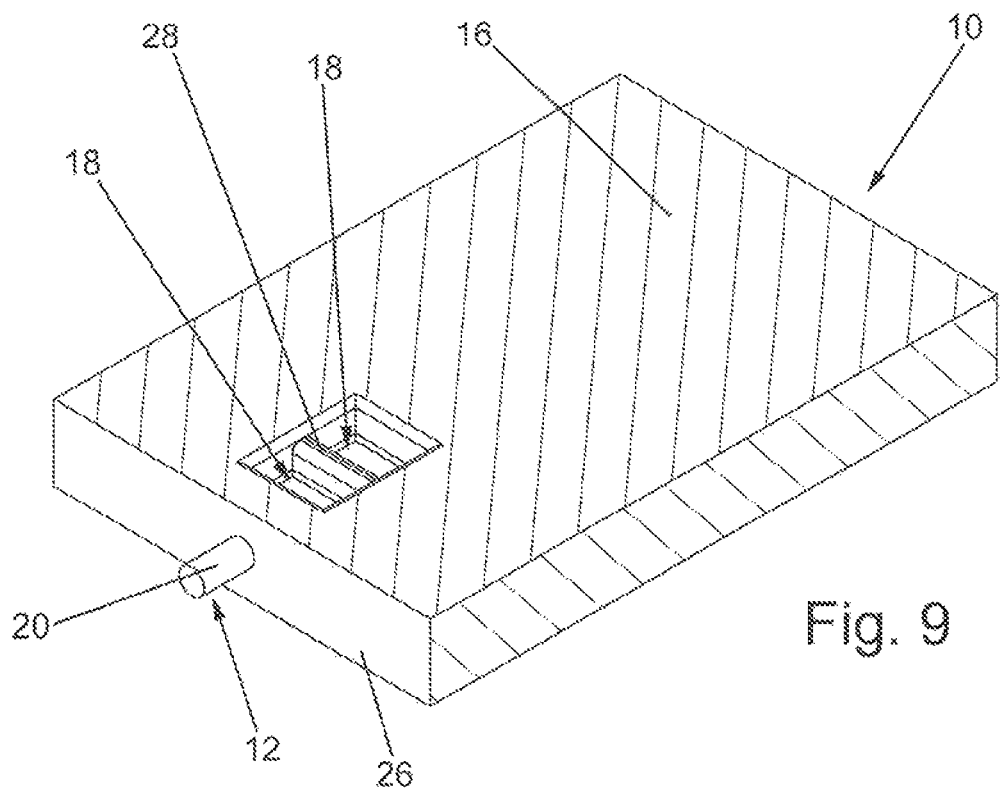
FIG. 9 is a perspective schematic view of an embodiment of the invention.
Figure 10:
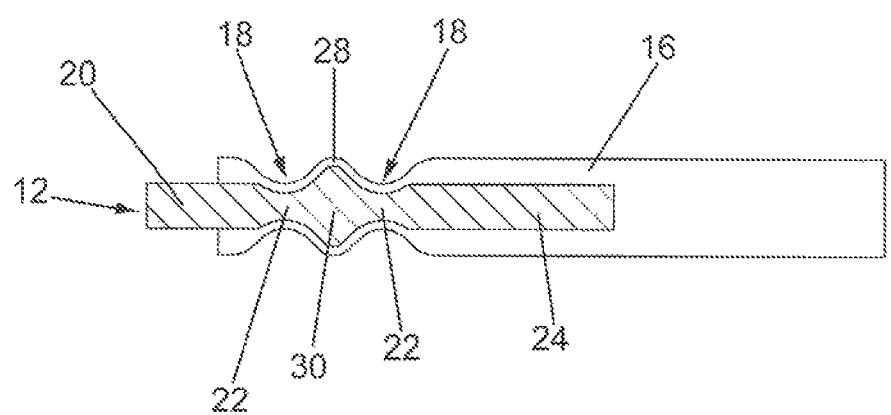
FIG. 10 is a cross-sectional schematic view of an embodiment of the invention.

An embodiment of the invention is illustrated and will be described with reference to FIGS. 9 and 10. FIG. 9 is a perspective schematic view and FIG. 10 is a cross-sectional schematic view taken parallel to the compression force applied in the high density region. In FIGS. 9 and 10 multiple high density regions, 18, are represented as being separated by a mid-density region, 28. The mid-density region has a lower density than the high density region and preferably the density of the mid-density region is at least as high as the bulk density. In one embodiment, the mid-density region has the same density as the bulk density. Multiple high density regions provide a significantly improved adhesion without significant loss of functional anode powder.

With the present invention the high density area around the flattened wire provides a strong wire-to-powder bond without a need for second sintering and the related change in chemical composition caused thereby. This approach can be used to improve the mechanical and electrical properties of anodes in a broad range of the powder, with virtually any available level of CV/g, whereas application of the welded wire is limited to relatively coarse powders.

It is particularly preferred that the anode be subjected to a deoxidation-sintering process, referred to is the art as deox-sinter or d-sinter, as set forth in U.S. Pat. No. 8,349,030. This is especially beneficial on high charge powder. Without being limited by theory, it is hypothesized that during deoxidation sintering the powder exhibits lower shrinkage, or even expansion, of the powder. With traditional sintering the shrinkage is hypothesized to form a bond with the wire and this bond is not adequately formed in deoxidation sintering as evidenced by the ease with which the wire and anode body are separated. The inability to form strong adhesion between the anode body and the embedded in the anode lead wire has limited the use of deoxidation sintering to lower charge density powders where the lead wire could be welded to the pre-sintered anodes. In a particularly preferred embodiment deoxidation-sintering can be done in concert with the high density compaction without the typically observed problems associated with poor bonding between the anode wire and pressed anode powder thereby allowing for the use of higher charge density powders and higher volumetric efficiency measured as the capacitance as a function of capacitor volume.

Pull strength is a measurement of the force required, measured by weight, to pull the anode wire from the anode. Pull strengths over 10 kg's can be realized with the instant invention and in some instances the pull strength is sufficiently high that Ta wire breakage occurs before the wire is successfully pulled from the sintered anode body.

The anode preferably comprises a valve metal or conductive oxide of the valve metal with particularly preferred anode materials being selected from aluminum, tantalum and niobium with tantalum being most preferred. The anode has a dielectric thereon, which is preferably an oxide of the anode metal. A cathode is on the dielectric wherein the cathode is preferably chosen from manganese dioxide and conductive polymer and most preferably 3,4-polyethylene dioxythiophene (PEDT). Dielectric formation and the formation of a cathode from manganese dioxide and conductive polymer is well known to those of skill in the art and further elaboration herein is not necessary.

The anode powder preferably has a charge density of at least 100,000 CV/g, more preferably at least 200,000 CV/g, even more preferably at least 400,000 CV/g and most preferably at least 500,000 CV/g as determined for tantalum or is a valve metal, such as niobium, with an equivalent surface area thereto.

Deoxidation sintering is accomplished by the use of a reducing agent with a higher oxygen affinity than the valve metal. Preferred reducing agents include alkali metals, alkaline earth metals or aluminum. Calcium, magnesium and aluminum are preferred reducing agents with magnesium being most preferred.

In the process of forming an anode a valve metal powder is pressed into pellets. It is optional, but preferable, to add a lubricant or binder to the powder. A lubricant or binder used during pressing improves the density uniformity through the pellet and prevents die wear-out. An anode lead wire is embedded into the pellet during the pressing. During pressing native oxide which covers the surface of the particles incorporates in the original necks which inhibits subsequent sintering processes.

If a lubricant or binder is used the lubricant or binder is removed by heating in vacuum, or by washing in aqueous detergents. The pressed anodes are deoxidized by reaction with a reducing agent in a deoxidizing furnace at temperatures above the melting point of the reducing agent and typically in the range of 900° C. to 1100° C. These temperatures are much lower than conventional sintering temperatures used for the coarse powders used in high voltage capacitors, which are typically sintered at temperatures in the range 1200° C.-2100° C. depending on the powder CV/g. This first deoxidizing process removes bulk oxygen from the powders preferably from the original necks between the powder particles created at the pressing process. More preferably the pressed pellets are placed in crucibles with Mg chunks or powder and deoxidized by heating above the melting point of magnesium.

In one embodiment, as described in U.S. Pat. No. 7,731,893 B2, the anodes are deoxidized by reducing agent, preferably magnesium, and sintered sequentially. The sealing layer of the reducing agent oxide on the anode surface prevents oxidation in air when anodes are removed from the deoxidizing furnace and placed in a sintering furnace. The layer of reducing agent oxide on the surface is removed preferably by leaching. Leaching can be accomplished in an aqueous mineral acid. A particularly suitable wash solution for removing MgO is a dilute aqueous solution of sulfuric acid and hydrogen peroxide. In other embodiment, described in U.S. Pat. No. 8,349,030 B1, deoxidized and leached anodes undergo sintering in vacuum in a sintering furnace at sintering temperatures equal to, or slightly lower than, conventionally used sintering temperatures. Sintering temperatures are preferably about 1,200° C. to about 1,800° C. and typically about 1500° C. After sintering the lead wire is attached to the sintered anode preferably by welding and the anode is preferably subjected to a second deoxidizing process and a leaching step wherein the oxide of the reducing agent is removed. The second deoxidizing step and leaching step is preferably performed under the same conditions as the first deoxidizing and leaching for manufacturing convenience though different conditions can be used within the scope of conditions suitable for removing the oxide of the reducing agent from the surface.

To form a capacitor the anode is anodized to form a dielectric on the surface wherein the dielectric is preferably an oxide of the valve metal. Anodization is well known in the art and the method of anodizing is not particularly limited herein. Other dielectrics could be incorporated without departing from the scope of the invention but oxides of the anode are widely used in the art.

A cathode layer is formed on the dielectric. The cathode is a conductive layer and may be formed from conductive polymers, such as conductive thiophenes with polyethylenedioxythiophene being exemplary for use in demonstrating the invention. Other cathode layers, such as manganese dioxide which is a conductive semiconductor, are suitable for use in demonstration of the invention. The cathode is formed by coating or in-situ polymerization as well known to those of skill in the art.

It is widely understood that external terminations are difficult to form on the cathode, particularly with a conductive polymeric cathode, and additional layers are typically included to facilitate termination. In particular, carbon layers overcoated with metal layers, such as silver or nickel, are suitable for demonstration of the invention. Carbon layers and metal layers are formed by coating and/or electroplating as well known to those of skill in the art.

The capacitor is typically finished which may include attachment of external anode terminations in electrical contact with the anode wire, external cathode terminations in electrical contact with the cathode, encapsulating in an insulator, testing, packaging and the like.

A vacuum refers to a pressure which is lower than atmospheric pressure. In practice a pressure of no more than ($10^{-4}$ atm) is suitable for demonstration of the teachings herein. Inert gas refers to non-reactive gases or gases which exclude oxidizers such as oxygen. Particularly preferred inert gases include nitrogen, argon, helium and neon. Argon is most preferred. Nitrogen can form nitrides at high sintering temperatures, particularly with tantalum, and is therefore less preferred.

EXAMPLES

Example 1

A series of tantalum anodes were prepared in identical fashion using 200,000 CV/g tantalum. The bulk of the anode was pressed to a density of 6.75 g/cc to form monolithic rectangular anode bodies having a size of about 5.20 mm (0.206") wide, 5.49 mm (0.216") long and 1.14 mm (0.045") thick. Throughout the examples, the control samples have no further pressing than used to achieve bulk density. In the inventive samples the powder in the vicinity of the wire was pressed at a compression ratio of about 2:1 or to the degree necessary to distort the 0.381 mm (0.015") diameter wire in the powder. The result was a pressed powder anode comprising an anode wire therein as represented schematically in FIG. 1. For the inventive anodes the powder was deox-sintered. For the control samples vaccum sintering was employed since the anode deteriorates under deox-sintering causing the anode wire to be easily separated from the anode and therefore further testing is not possible or of minimal value. The dielectric was formed at 40 volts. The pull strength of the samples is provided in Table 1 wherein the improved wire pull strength illustrates an advantage of the invention. The increase in charge demonstrates the advantages of deox-sintering, thereby providing a significant increase in charge density with the same tantalum powder.

TABLE 1

| Sample | Wire pull strength (Kg) | Charge @ 50 Hz (Cv/g) | Wet LKG (nA/CV) |
|---|---|---|---|
| Inventive | 6.363 | 85,786 | — |
| Control | 1.021 | 78,860 | — |
| Inventive | 3.152 | 94,912 | 0.21 |
| Control | 1.356 | 77,197 | 0.27 |

Example 2

A series of tantalum anodes were prepared in identical fashion using tantalum powder of various charge densities as indicated in Table 2. The bulk of the anode was pressed to a density as reported in Table 2 to form monolithic rectantular anode bodies having a size of about 2.39 mm (0.094") wide, 1.78 mm (0.070") long and 0.48 mm (0.019") thick. In the control samples no further pressing was done. In the inventive samples the powder in the vicinity of the wire was pressed at a compression ratio of about 2:1 or to the degree necessary to distort the 0.300 mm (0.0118") diameter wire in the powder. A dielectric was formed on the anode at a formation voltage (Vf) as listed in Table 2. The anodes were tested for electrical properties. The control that did not have the powder pressed around the anode, but was deox-sintered, failed due to separation of the anode wire from the anode body and no electrical results could be obtained.

TABLE 2

| Sample | Powder Charge (CV/g) | Sinter | Press Density (g/cc) | Wire Pull Strength (Kg) | Vf (Volts) | Charge @50 Hz (CV/g) | Wet Lkg (nA/CV) |
|---|---|---|---|---|---|---|---|
| Inventive | 200,000 | Deox | 7.3 | 2.200 | 40 | 89,394 | 0.13 |
| Inventive | 200,000 | Deox | 7.3 | 2.531 | 25 | 98,883 | 0.50 |
| Inventive | 200,000 | Deox | 7.3 | 2.531 | 40 | 87,273 | 0.32 |
| Inventive | 200,000 | Deox | 7.3 | 2.531 | 60 | 69,545 | 0.36 |
| Inventive | 200,000 | Deox | 7.3 | 2.531 | 75 | 48,750 | 0.32 |
| Control | 200,000 | Deox | 7.3 | 0 | — | — | — |
| Inventive | 150,000 | Deox | 7.3 | 2.159 | 25 | 92,000 | 0.34 |
| Inventive | 150,000 | Deox | 7.3 | 2.159 | 40 | 73,067 | 0.25 |
| Inventive | 150,000 | Deox | 7.3 | 2.159 | 60 | 58,920 | 0.27 |
| Inventive | 150,000 | Deox | 7.3 | 2.159 | 75 | 39,600 | 0.29 |
| Control | 80,000 | Standard | 7.0 | 2.345 | 40 | 72,758 | 0.60 |

The results presented in Table 2 demonstrate an advantages of the invention which allows for the use of deoxidation sintering while still achieving comparable adhesive strength between the anode body and anode wire. At equivalent formation voltage an improvement in wet leakage (Wet Lkg) can be therefore be realized.

Example 3

A series of anodes were prepared as in Example 2 using 200,000 CV/g tantalum powder. The powder was pressed to a density of 6.75 g/cc with the high density portion in the vicinity of the wire pressed at a compression ratio of about 2:1. In this example the high pressure was offset from the point of egress as illustrated in FIGS. 9 and 10 such that a bulk density region was between the high pressure region and the face from which the anode wire egressed. The controls did not have a high density region and the entirety of the anode was pressed to the same density as the bulk density of the inventive examples. The anodes formed were either a W size case with dimensions of 3.56 mm (0.140") wide, 5.08 mm (0.200") long and 20.65 mm (0.813") or an H size case with dimensions of 5.23 mm (0.206") wide, 5.49 mm (0.216") long and 1.14 mm (0.045") thick. Tantalum wires with a diameter of 0.381 mm (0.015") were used. The samples were sintered in a deoxidation sintering process. Some of the samples were used to determine the average wire pull strength, which is reported in Table 3, and others were used to determine the average electrical properties at various dielectric formation voltages. For the W case size control the wire was insufficiently bound to the anode to achieve electrical results. Electrical results were obtained for carefully handled H case size controls, however, the pull strength is inadequate for consideration in a viable product and most failed catastrophically therefore the results for wire pull strength is skewed artificially for the H case size control as a limited set was testable. The results of charge and wet leakage at various dielectric formation voltages (Vf) are reported in Table 3.

TABLE 3

| Sample | Case size | Wire pull strength (Kg) | Vf (volts) | Charge @ 50 Hz (CV/g) | Wt Lkg (nA/CV) |
|---|---|---|---|---|---|
| Inventive | W | 6.051 | 40 | 86,552 | 0.65 |
| Inventive | W | 6.051 | 50 | 76,544 | 0.34 |
| Inventive | W | 6.051 | 65 | 59,437 | 0.61 |
| Control | W | 0 | — | — | — |
| Inventive | H | 5.107 | 40 | 93,446 | 0.209 |
| Inventive | H | 5.107 | 50 | 83,342 | 0.226 |
| Inventive | H | 5.107 | 65 | 66,150 | 0.319 |
| Control | H | 1.356 | 40 | 77,197 | 0.27 |

The results presented in Table 3 demonstrate the advantages of the inventive concept and especially the synergism achievable with the high density pressing around the wire and deoxidation sintering. In particular, with a given powder a higher charge can be obtained, at equivalent formation voltage, with lower wet leakage.

Example 4

A series of anodes were prepared as in Example 2 using tantalum powder with a nominal charge as indicated in Table 4. The anodes were pressed to a density as indicated in Table 4 to either a B-1 case size which was 2.26 mm (0.089") wide, 1.63 mm (0.064") long and 1.04 mm (0.041") thick or a B-2 case size which was 2.13 mm (0.084") wide, 1.52 mm (0.060") long and 0.99 mm (0.039") thick. For the B-1 case size a tantalum wire with a 0.30 mm (0.0118") diameter was used. For the B-2 case size a tantalum wire with a 0.19 mm (0.0074") diameter was used. The anodes were vacuum sintered at the temperatures reported in Table 4. The average wire pull strength and average volume shrinkage was determined and reported in Table 4.

TABLE 4

| Sample | Charge (CV/g) | Case size | Sintering temperature (° C.) | Press Density (g/cc) | Wire Pull Strength (Kg) | Vol. Shrinkage (%) |
|---|---|---|---|---|---|---|
| Inventive | 120,000 | B-1 | 1125 | 6.0 | 1.851 | 0.44 |
| Inventive | 120,000 | B-1 | 1150 | 6.0 | 2.517 | 0.92 |
| Inventive | 120,000 | B-1 | 1225 | 6.0 | 3.878 | 4.40 |
| Inventive | 120,000 | B-1 | 1125 | 6.4 | 2.304 | 1.25 |
| Inventive | 120,000 | B-1 | 1150 | 6.4 | 2.735 | 2.08 |
| Inventive | 120,000 | B-1 | 1225 | 6.4 | 4.109 | 5.56 |
| Inventive | 120,000 | B-1 | 1125 | 6.85 | 3.946 | 1.83 |
| Inventive | 120,000 | B-1 | 1150 | 6.85 | 4.150 | 2.22 |
| Inventive | 120,000 | B-1 | 1225 | 6.85 | 4.418 | 6.05 |
| Control | 120,000 | B-2 | 1100 | 6.5 | 0.095 | −0.42 |
| Control | 120,000 | B-2 | 1150 | 6.5 | 0.490 | 3.67 |
| Control | 120,000 | B-2 | 1180 | 6.5 | 1.365 | 9.29 |
| Control | 150,000 | B-2 | 1100 | 6.5 | 0.064 | −0.73 |
| Control | 150,000 | B-2 | 1150 | 6.5 | 0.458 | 1.27 |
| Control | 150,000 | B-2 | 1180 | 6.5 | 0.717 | 3.24 |
| Control | 150,000 | B-2 | 1200 | 6.5 | 1.070 | 4.03 |
| Control | 150,000 | B-2 | 1250 | 6.5 | 1.855 | 9.47 |

Figure 11:
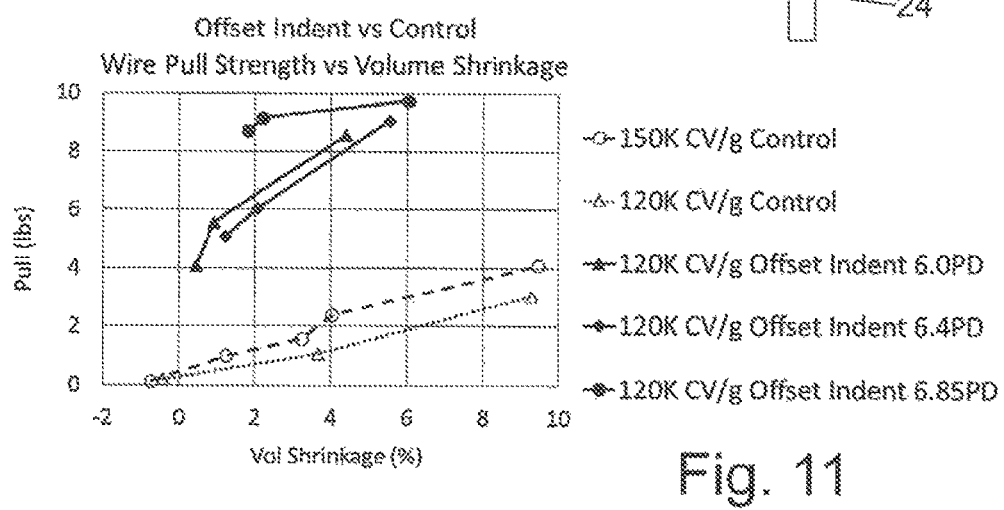
FIG. 11 is a graphical representation of an embodiment of the invention.

Additional results illustrating the advantages of an offset indent, wherein the high density region does not reach the wire egress face, is provide graphically in FIG. 11 wherein pull strength versus vol. shrinkage is shown. The results presented in Table 4, and FIG. 11, illustrate the advantages of the high density compression region in the vicinity of the anode wire wherein, at the same level of volumetric shrinkage, the wire pull strength and therefore product robustness is improved.

Example 5

Figure 12:
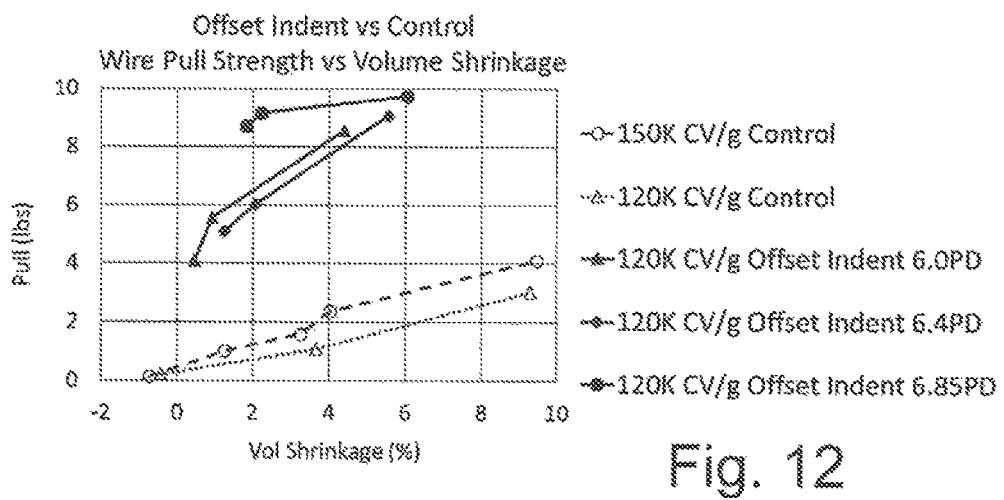
FIG. 12 is a graphical representation of an embodiment of the invention.

A series of anodes were prepared with a tantalum powder have a 200,000 CV/g charge. Each sample was pressed to a density of 6.75 g/cc into a rectangular anode having a size of 3.56 mm (0.140") wide, 5.08 mm (0.200") length and 0.813 mm (0.032") thick around an anode wire with a diameter of 0.381 mm (0.015"). The anodes were deoxidation sintered. The control received no further compression. The inventive sample received multiple high density compressions with a mid-density compression between the high density press regions as illustrated and described relative to FIGS. 9 and 10. The inventive example exhibited a wire pull strength of 6.04 Kg and after dielectric formation at 40 volts a charge @ 50 Hz of 79,039 CV/g with a wet leakage of 0.20 nA/CV was observed. The control separated from the anode and was not tested further. Additional samples with multiple indentations within the high density region is provided in FIG. 12.

The invention has been described with reference to the preferred embodiments without limit thereto. One of skill in the art would realize additional embodiments and alterations which are not specifically stated herein but are within the scope of the invention as set forth in the claims appended hereto.

The invention claimed is:
1. A method for forming a capacitor anode comprising:
 inserting an anode wire in an anode powder with a first portion of said anode wire extending from said anode powder;

pressing a portion of said anode powder to form a bulk region having a first density; and pressing a second portion of said anode powder with said anode wire in said second portion to form a high density portion having a second density wherein said pressing of said second portion is sufficient to distort said anode wire in said second portion.

2. The method for forming a capacitor anode of claim 1 wherein said second density is at least 125% to no more than 200% of said first density.

3. The method for forming a anode of claim 2 wherein said second density is at least 150% of said first density.

4. The method for forming a capacitor anode of claim 1 wherein said anode powder has a charge density of at least 100,000 CV/g.

5. The method for forming a capacitor anode of claim 4 wherein said anode powder has a charge density of at least 200,000 CV/g.

6. The method for forming a capacitor anode of claim 5 wherein said anode powder has a charge density of at least 300,000 CV/g.

7. The method for forming a capacitor anode of claim 6 wherein said anode powder has a charge density of at least 400,000 CV/g.

8. The method for forming a capacitor anode of claim 7 wherein said anode powder has a charge density of at least 500,000 CV/g.

9. The method for forming a capacitor anode of claim 1 wherein said anode powder comprises a valve metal.

10. The method for forming a capacitor anode of claim 9 wherein said valve metal is selected from niobium and tantalum.

11. The method for forming a capacitor anode of claim 1 wherein said pressing said second portion forms a distorted region in said anode wire wherein said distorted region has a longest cross-sectional length which is at least 10% longer than an equivalent diameter of said anode wire.

12. The method for forming a capacitor anode of claim 11 wherein said longest cross-sectional length is at least 15% longer than said equivalent diameter.

13. The method for forming a capacitor anode of claim 12 wherein said longest cross-sectional length is at least 20% longer than said equivalent diameter.

14. The method for forming a capacitor anode of claim 1 wherein said high density region is an inset high density region.

15. The method for forming a capacitor anode of claim 1 comprising pressing two said second portions.

16. The method for forming a capacitor anode of claim 15 comprising pressing a mid-density portion between said two second portions.

17. The method for forming a capacitor anode of claim 1 further comprising sintering of said anode.

18. The method for forming a capacitor anode of claim 17 wherein said sintering comprises deoxidation sintering of said anode.

19. A method for forming a capacitor comprising forming a dielectric and cathode on said capacitor anode of claim 1.

20. A method for forming a capacitor comprising:

inserting an anode wire in an anode powder with a first portion of said anode wire extending from said anode powder;

pressing a portion of said anode powder to form a bulk region having a first density;

pressing a second portion of said anode powder with said anode wire in said second portion to form a high density portion having a second density wherein said pressing of said second portion is sufficient to distort said anode wire in said second portion;

deoxidation sintering of said anode to form a sintered anode;

forming a dielectric on said sintered anode; and forming a cathode on said dielectric.

21. The method for forming a capacitor anode of claim 20 wherein said second density is at least 125% to no more than 200% of said first density.

22. The method for forming a anode of claim 21 wherein said second density is at least 150% of said first density.

23. The method for forming a capacitor anode of claim 20 wherein said anode powder has a charge density of at least 100,000 CV/g.

24. The method for forming a capacitor anode of claim 23 wherein said anode powder has a charge density of at least 200,000 CV/g.

25. The method for forming a capacitor anode of claim 24 wherein said anode powder has a charge density of at least 300,000 CV/g.

26. The method for forming a capacitor anode of claim 25 wherein said anode powder has a charge density of at least 400,000 CV/g.

27. The method for forming a capacitor anode of claim 26 wherein said anode powder has a charge density of at least 500,000 CV/g.

28. The method for forming a capacitor anode of claim 20 wherein said anode powder comprises a valve metal.

29. The method for forming a capacitor anode of claim 28 wherein said valve metal is selected from niobium and tantalum.

30. The method for forming a capacitor anode of claim 20 wherein said pressing said second portion forms a distorted region in said anode wire wherein said distorted region has a longest cross-sectional length which is at least 10% longer than an equivalent diameter of said anode wire.

31. The method for forming a capacitor anode of claim 30 wherein said longest cross-sectional length is at least 15% longer than said equivalent diameter.

32. The method for forming a capacitor anode of claim 31 wherein said longest cross-sectional length is at least 20% longer than said equivalent diameter.

33. The method for forming a capacitor anode of claim 20 wherein said high density region is an inset high density region.

34. The method for forming a capacitor anode of claim 20 comprising pressing two said second portions.

35. The method for forming a capacitor anode of claim 34 comprising pressing a mid-density portion between said two second portions.

* * * * *